(12) United States Patent
Parmeter et al.

(10) Patent No.: US 9,074,597 B2
(45) Date of Patent: Jul. 7, 2015

(54) RUNNER WITH INTEGRAL IMPELLOR PUMP

(75) Inventors: Larry A. Parmeter, Broken Arrow, OK (US); Dan A. Merrill, Claremore, OK (US); Michael R. Rumbaugh, Claremore, OK (US); Chad A. Craig, Tulsa, OK (US)

(73) Assignee: BAKER HUGHES INCORPORATED, Houston, TX (US)

( * ) Notice: Subject to any disclaimer, the term of this patent is extended or adjusted under 35 U.S.C. 154(b) by 1122 days.

(21) Appl. No.: 13/083,762

(22) Filed: Apr. 11, 2011

(65) Prior Publication Data

US 2012/0257998 A1   Oct. 11, 2012

(51) Int. Cl.
| | |
|---|---|
| F04D 13/08 | (2006.01) |
| F04B 53/18 | (2006.01) |
| F04D 13/10 | (2006.01) |
| F04D 29/041 | (2006.01) |
| F16C 17/04 | (2006.01) |
| F16C 33/10 | (2006.01) |
| F04D 13/06 | (2006.01) |

(52) U.S. Cl.
CPC ............... *F04B 53/18* (2013.01); *F04D 13/08* (2013.01); *F04D 13/086* (2013.01); *F04D 13/0633* (2013.01); *F04D 13/10* (2013.01); *F04D 29/041* (2013.01); *F16C 17/04* (2013.01); *F16C 33/1065* (2013.01); *F16C 33/107* (2013.01)

(58) Field of Classification Search
CPC .... F04D 13/0633; F04D 13/08; F04D 13/086
USPC ............. 417/423.3, 423.12, 423.13; 384/369, 384/370, 371, 368
See application file for complete search history.

(56) References Cited

U.S. PATENT DOCUMENTS

| | | | | |
|---|---|---|---|---|
| 2,289,053 | A | * | 7/1942 | Watres ........................ 384/398 |
| 3,880,434 | A | * | 4/1975 | Echard et al. ................ 277/348 |
| 3,893,737 | A | * | 7/1975 | Tyson ........................... 384/307 |
| 3,966,279 | A | | 6/1976 | Raimondi |
| 4,000,559 | A | * | 1/1977 | Korrenn et al. .............. 384/101 |
| 4,468,168 | A | | 8/1984 | Aubert |
| 4,668,168 | A | | 5/1987 | Schilder et al. |

(Continued)

OTHER PUBLICATIONS

PCT/US12/030571; International Search Report dated Oct. 8, 2012; Baker Hughes Incorporated.

*Primary Examiner* — Christopher Bobish
(74) *Attorney, Agent, or Firm* — Mossman, Kumar & Tyler PC

(57) ABSTRACT

In aspects, the present disclosure provides an apparatus for handling axial thrust in rotating equipment. The apparatus may include a thrust bearing and a runner having a contact surface engaging the thrust bearing. The runner may include passages extending between the contact surface and an opposing surface of the runner. The apparatus may further include a lock ring assembly that has channels in communication with the passages of the runner. In certain embodiments, one or more cavities may be formed on the contact surface of the runner. The cavities may be in communication with the internal passages of the runner. In aspects, the present disclosure provides a method for handling axial thrust in a pump assembly. The pump assembly may include a thrust bearing assembly that may include a runner having a contact surface engaging a thrust bearing pad. The method may include flowing a lubricating fluid to the contact surface using at least one internal passage formed in runner.

11 Claims, 3 Drawing Sheets

(56) References Cited

U.S. PATENT DOCUMENTS

| | | |
|---|---|---|
| 5,035,519 A | 7/1991 | Aizawa et al. |
| 5,054,583 A | 10/1991 | Wrzyszczynski |
| 5,141,422 A | 8/1992 | Ito et al. |
| 5,209,577 A | 5/1993 | Swatek |
| 5,368,110 A | 11/1994 | French |
| 5,782,302 A | 7/1998 | Ringgenberg et al. |
| 5,813,469 A | 9/1998 | Bowlin |
| 5,957,656 A | 9/1999 | De Long |
| 6,012,900 A | 1/2000 | Kennedy et al. |
| 6,093,001 A | 7/2000 | Burgreen et al. |
| 6,099,271 A | 8/2000 | Brookbank |
| 6,109,790 A | 8/2000 | Von Gynz-Rekowski et al. |
| 6,439,325 B1 | 8/2002 | Peters et al. |
| 6,439,866 B1 | 8/2002 | Farkas et al. |
| 6,666,664 B2 | 12/2003 | Gross |
| 6,837,621 B1 | 1/2005 | Sakamoto |
| 7,492,069 B2 | 2/2009 | Knox et al. |
| 7,621,346 B1 | 11/2009 | Trinh et al. |
| 7,841,395 B2 | 11/2010 | Gay et al. |
| 2009/0242276 A1 | 10/2009 | Hummes et al. |

\* cited by examiner

US 9,074,597 B2

RUNNER WITH INTEGRAL IMPELLOR PUMP

FIELD OF THE DISCLOSURE

This disclosure generally relates to techniques for circulating lubricating oil in sealed thrust bearing assemblies.

BACKGROUND OF THE DISCLOSURE

Rotating machinery often includes thrust bearing assemblies to handle thrust loadings generated during operation. A conventional thrust bearing assembly may include stationary thrust bearing pads that engage a rotating thrust runner ("runner"). The thrust bearing pads and runner may be enclosed in a sealed casing that is filled with high dielectric oil. When the equipment is started, the rotating runner normally "drags" oil into and between the bearing pads and the runner. Importantly, delays in forming an oil film between the contact surfaces of these parts may be harmful. For instance, in situations when the assembly is static, an axial loading may displace the oil between the thrust bearing and the runner. Moreover, because the contact surfaces of the thrust bearing and runner may be extremely flat, these parts tend to "stick" together, an effect sometimes referred to as "wringing." The lack of oil at the contact faces of parts that have stuck together at the crucial moment of equipment start-up can damage these contact surfaces as they rub together. If this process is repeated enough times through repeated starts and stops, a catastrophic failure may eventually occur.

The present disclosure addresses these and other problems of the prior art.

SUMMARY OF THE DISCLOSURE

In aspects, the present disclosure provides an apparatus for handling axial thrust in rotating equipment. The apparatus may include a thrust bearing and a runner having a contact surface engaging the thrust bearing. The runner may include a central bore and one or more internal passages that convey a lubricating fluid to the contact surface. This lubricating fluid may be pressurized using an impeller-type pump incorporated into a lock ring assembly that secures the runner to a drive shaft. Also, the contact surface of the runner may include one or more cavities or pockets that act as reservoirs for the lubricating fluid. These oil pockets are immediately available at equipment start-up to lubricate and protect contact surfaces.

Examples of some features of the disclosure have been summarized rather broadly in order that the detailed description thereof that follows may be better understood and in order that the contributions they represent to the art may be appreciated.

BRIEF DESCRIPTION OF THE DRAWINGS

For a detailed understanding of the present disclosure, reference should be made to the following detailed description of the embodiments, taken in conjunction with the accompanying drawings, in which like elements have been given like numerals, wherein.

DETAILED DESCRIPTION

This disclosure relates to devices and methods for rapidly and efficiently lubricating the contact surfaces of sealed thrust bearings at equipment start-up and during operation. This enhanced lubrication may allow thrust bearing assemblies to use lubricating oils (hereafter, "oil" or "oils") formulated for adverse operating conditions (e.g., high-temperature environments). Such oils may have properties (e.g., high viscosity, density, weight, shear resistance, etc.) that resist flowing into a gap between contact surfaces. Thus, embodiments of the present disclosure make oil readily available at motor start by using oil pockets formed in a contacting runner surface and an impeller-type pumping device to force oil between contact surfaces. These features enable immediate coating of contact surfaces and development of a hydrodynamic wedge between these contact surfaces. Illustrative non-limiting embodiments are discussed in greater detail below.

Figure 1:
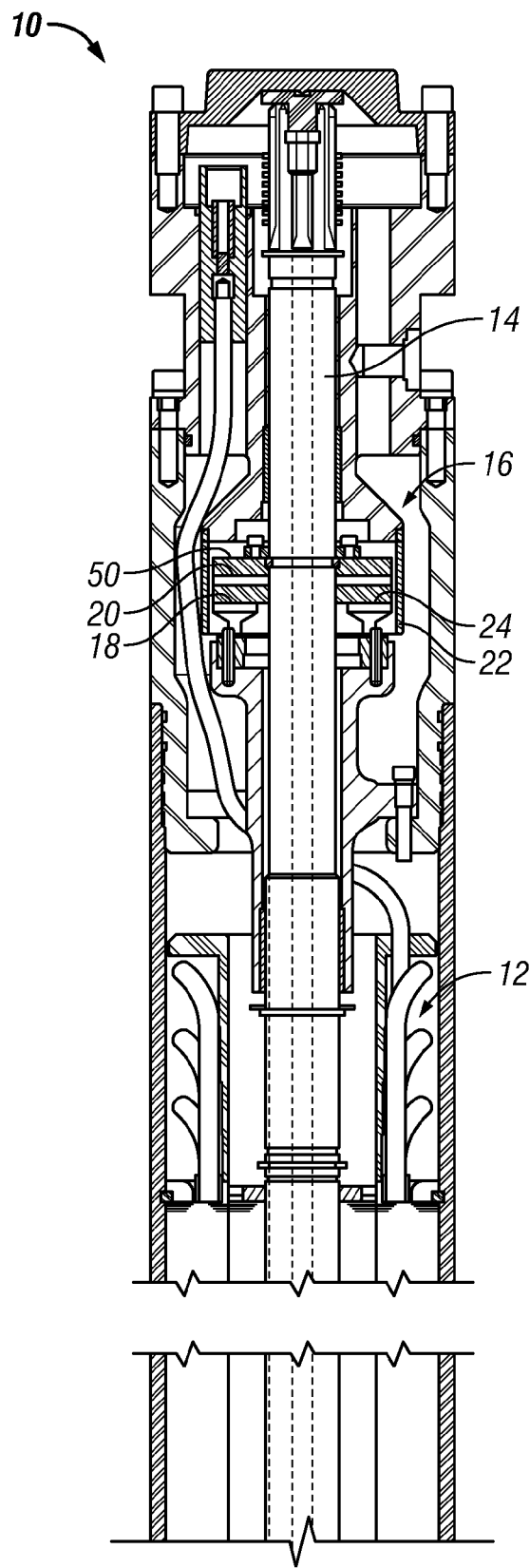
FIG. 1 shows a sectional view of a pump assembly according to one embodiment of the present disclosure.

Referring now to FIG. 1, there is sectionally shown an electric submersible pump assembly 10 that includes a motor section 12 that drives a pump section (not shown) via a shaft 14. A thrust bearing assembly 16 bears the axial loading or thrust generated during operation of the pump assembly 10. The thrust bearing assembly 16 may include a plurality of thrust pads 18, a runner 20 that transmits thrust loadings to the pads 18, and a lock plate assembly 50 that locks the runner 20 to the shaft 14. The thrust bearing assembly 16 may be enclosed in a sealed enclosure 22 that is filled with oil (not shown).

In certain embodiments, the runner 20 may include passages through which oil can be forced into a gap 24 between the contact surfaces of the pads 18 and the runner 20. The lock plate assembly 50 may include an impeller-type pump arrangement that supplies pressurized oil to the passages of the runner 20. Also, the contact surface of the runner 20 may include pockets that act as oil reservoirs. Further details regarding these and other embodiments are discussed below.

Figure 2:
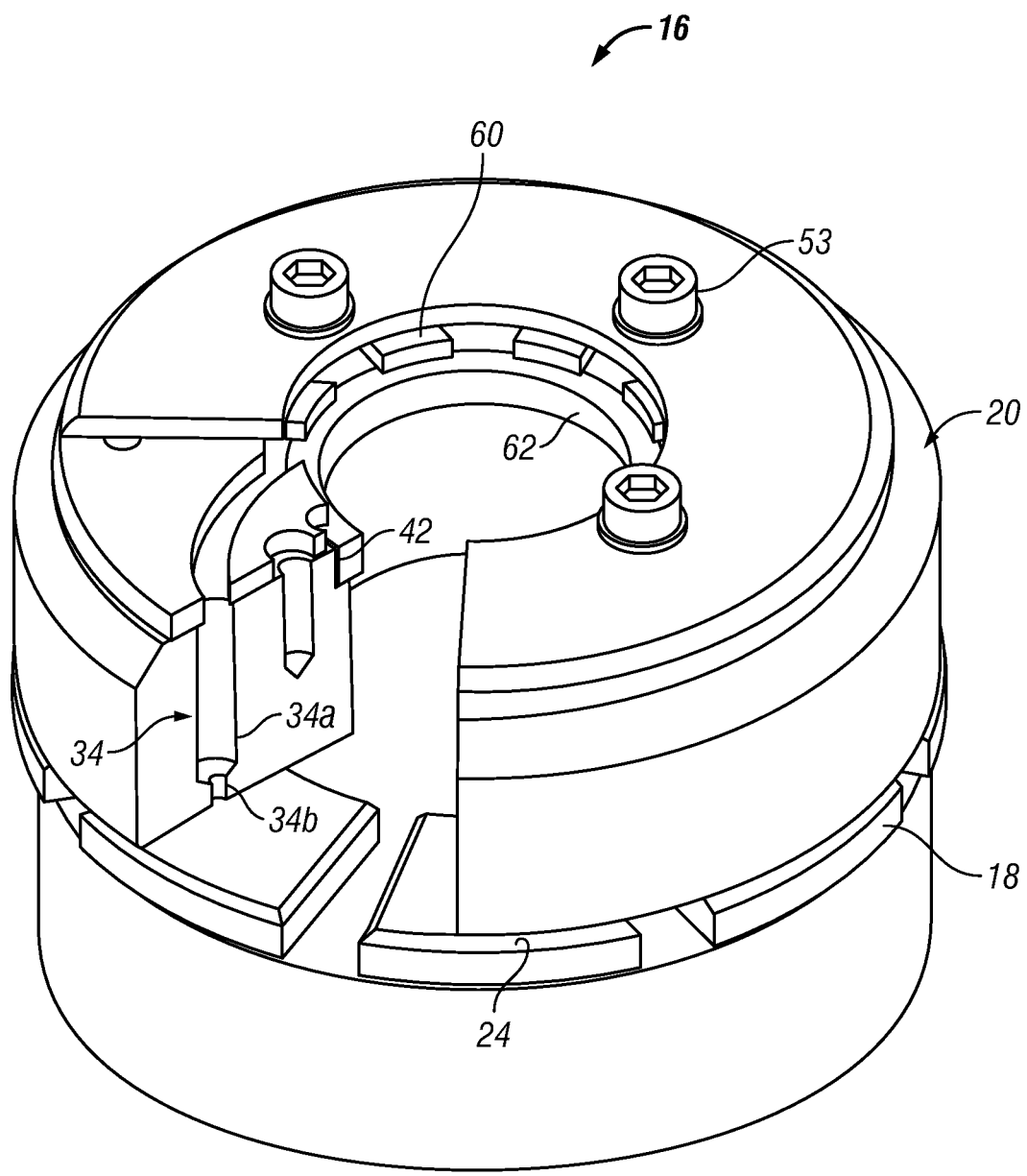
FIG. 2 shows a sectional isometric view of a thrust bearing assembly according to one embodiment of the present disclosure.
Figure 3:
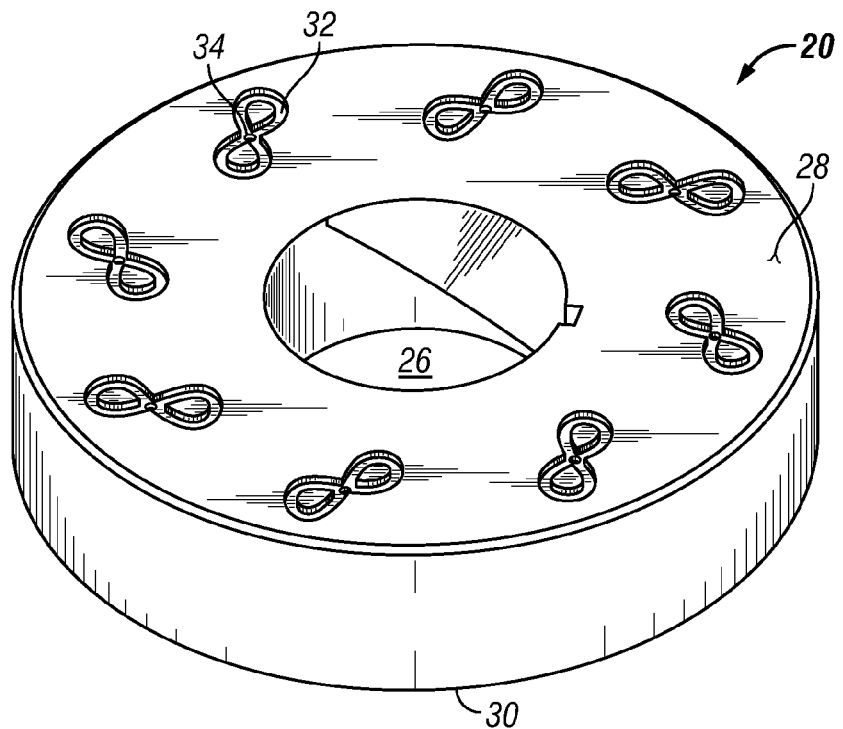
FIG. 3 shows a sectional isometric view of a runner according to one embodiment of the present disclosure.

Referring now to FIGS. 2 and 3, there is shown one embodiment of a thrust runner 20 that forces oil into the gap 24. The runner 20 may be formed as a ring having a center bore 26 for receiving the shaft 14 (FIG. 1), a contact face 28 that contacts and applies axial/thrust loadings to the thrust pads 18, and an opposing back face 30. The contact face 28 may include one or more recesses or pockets 32 that act as a reservoir for oil. In one non-limiting embodiment, an array of "figure eight" shaped pockets 32 may be machined into the contact face 28. By providing pockets of oil at all times, the figure-eight pocket configuration may prevent the parts from "sticking" together during static periods and allow a hydrodynamic wedge to quickly develop. Shapes other than "figure eights" may also be used for the pockets, e.g., circles.

The runner 20 may include passages that direct oil flow into the gap 24. For instance, the passages may be holes 34 at the geometric center of the figure eights. The holes 34 may be drilled completely through the runner 20, i.e., between the contact face 28 and the back face 30. In some arrangements, the holes 34 may incorporate a geometry that increases the pressure of fluid flowing from the back face 30 to the contact face 28. For example, the holes 34 may include an inlet section 34a that has a larger diameter or cross-sectional flow area than an outlet section 34b. The reduction in diameter/flow causes a pressure multiplication in the fluid exiting the outlet section 34b.

Figure 4:
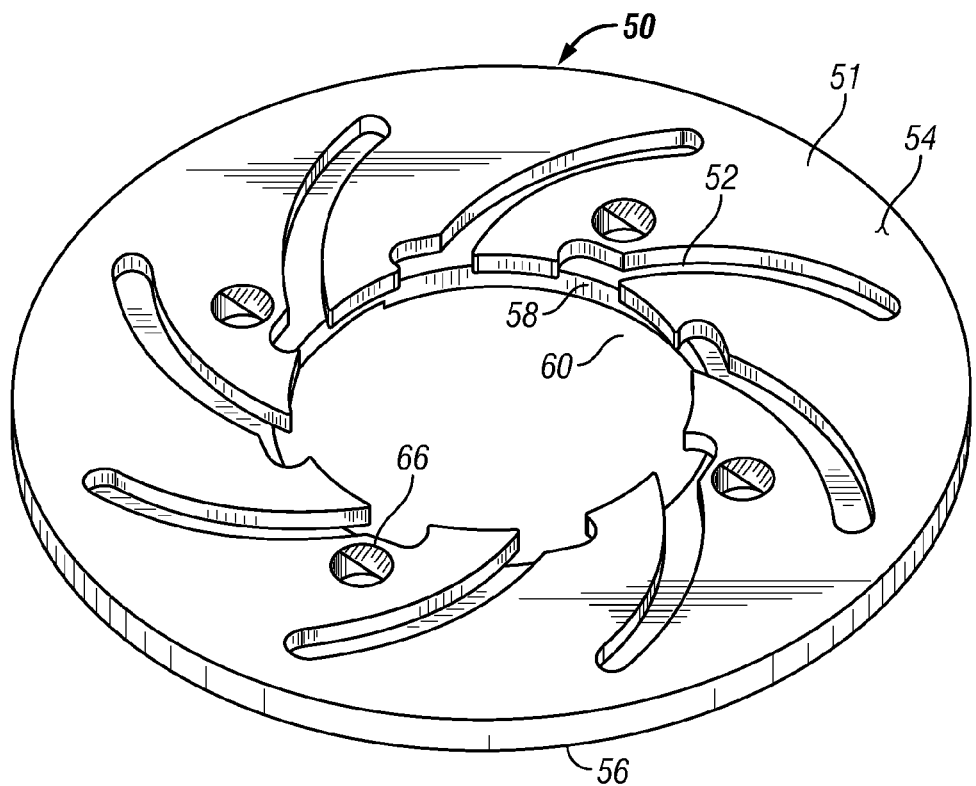
FIG. 4 shows a sectional isometric view of a lock plate according to one embodiment of the present disclosure.

Referring to FIGS. 2 and 4, the lock plate assembly 50 may be adapted to operate as an impeller-type pump that pumps oil into the holes 34 of the runner 20. The lock plate assembly 50 may include a ring-shaped lock plate 51 and fasteners 53. The lock plate 51 has an engagement face 54 that includes grooves 52. The grooves 52 may be formed as spirals that are shaped to accelerate fluid from the center of the lock plate 51 radially outwards. Shapes other than spirals may also be used. The grooves 52 extend across the engagement face 54 at least far enough to communicate with the holes 34 of the runner 20. The back side 56 of the lock plate 51 includes a counter bore 58 that forms an annular space or gap 60 around the shaft 14 (FIG. 1) through which oil can enter the grooves 52.

In one arrangement, the lock plate assembly 50 may secure the runner 20 on the shaft 14 (FIG. 1) with a pair of split rings 62. For example, the split rings 62 may seat in a circular groove (not shown) machined into the shaft 14. A counter bore 42 formed in the runner 20 may be formed to receive the exposed portions of the seated split rings 62. The lock plate 51 may be positioned on the opposite side of the split rings 62 along the shaft 14 (FIG. 1) and the fasteners 53 may be inserted through suitable holes 66 in the lock plate 51 and threaded into the runner 20. Tightening the fasteners 53 squeezes the split rings 62 between the runner 20 and the lock plate 51, which locks the runner 20 and the lock plate assembly 50 to the shaft 14 (FIG. 1).

Referring now to FIGS. 1 and 2, while in a static or deactivated condition, the oil in the enclosure 22 of the thrust bearing assembly 16 is not circulating. And, as discussed previously, an axial loading on the shaft 14 may displace the oil out of the gap 24 between the thrust bearing pads 18 and the runner 20. In the FIGS. 1 and 2 embodiments, however, oil still resides in the pockets 32 (FIG. 3).

Once the pump assembly 10 is activated, the oil in the pockets 32 (FIG. 3) is immediately available to coat the contact surfaces and to generate a hydrodynamic wedge. Furthermore, shaft rotation initiates impeller-induced fluid circulation in the enclosure 22. Specifically, as the lock plate 50 rotates with the shaft 14, oil flows through the annular space 60 and into the grooves 52. The grooves 52 cause the oil to accelerate while flowing radially outward. The accelerated and pressurized oil next flows into the holes 34 at the back face 30 of the runner 20. The reduced diameter section 34b further increases the pressure of the oil that flows through the runner 20 and exits into the pockets 32. Thus, pressurized oil is forced into the gap 24. During operation, oil circulates within the thrust bearing assembly 16 due to the described active/positive pumping and due to natural convection caused by thermal gradients in the enclosure 22. This enhanced oil circulates helps to lubricate and transfer heat away from the thrust bearing assembly parts.

It should be appreciated that thrust bearings according to the present disclosure immediately coat and protect contact surfaces at the moment the pump 10 is started. Thus, the risk that the runner 20 and bearing pads 18 will be damaged by unlubricated contact surfaces at start-up is minimized, if not eliminated. As discussed previously, this enhanced fluid circulation may be useful in instances where a pump may be used in environments that require relatively heavy or highly viscous oils. For instance, subsurface oil and gas production applications encounter ever increasing well temperatures. Such situations require heavier oils in order to maintain an adequate oil film thickness. These types of lubricating oil have properties (e.g., high density, viscosity, etc.) that may initially resist flowing into the gaps between contact surfaces. Favorably, the positive or active pumping of oil, together with the oil pockets, can rapidly coat the contact surfaces even when the relatively heavier oils are used.

It should further be appreciated that while the oil circulation techniques of the present disclosure have been discussed in the context of an electrical submersible pumps, the present teachings may be applied to thrust bearing assemblies used in any rotation machinery.

While the foregoing disclosure is directed to the one mode embodiments of the disclosure, various modifications will be apparent to those skilled in the art. It is intended that all variations be embraced by the foregoing disclosure.

We claim:

1. An electric submersible pump, comprising:
   a pump section;
   a motor section driving the pump section; and
   a thrust bearing assembly bearing an axial loading generated when the motor section drives the pump section, comprising:
      a plurality of thrust pads;
      a runner having a contact face engaging the thrust pads, the runner including a center bore and at least one passage conveying a lubricating oil to the contact face; and
      a lock plate assembly securing the runner to a rotatable shaft and including at least one groove being in communication with the at least one passage, wherein the at least one groove is configured to accelerate the lubricating oil in a radially outward direction when the shaft is rotated.

2. The pump of claim 1, wherein the at least one passage extends between the contact face and an opposing face of the runner.

3. The pump of claim 1, wherein the at least one passage has a reduced diameter proximate to the contact face.

4. The pump of claim 1, wherein the lock plate assembly includes a lock plate coupled to the runner, and wherein the at least one groove radially traverses a surface of the lock plate.

5. The pump of claim 1, further comprising at least one recess formed on the contact face, the at least one passage being in communication with the at least one recess.

6. The pump of claim 5, wherein the lubricating oil resides in the at least one recess when the thrust bearing assembly is static.

7. The pump of claim 1, further comprising a sealed enclosure in which the thrust bearing and the runner are disposed, the sealed enclosure being filled with the lubricating oil.

8. A thrust bearing assembly for use in an electric submersible pump, comprising:
   a plurality of thrust bearing pads;
   a runner having a contact face engaging the thrust bearing pads, the runner including a central bore and at least one passage conveying a lubricating oil to the contact face; and
   a lock plate securing the runner to a rotatable shaft, the lock plate including at least one groove configured to accelerate the lubricating oil, the at least one groove being in communication with the at least one passage; and
   a sealed enclosure in which the thrust bearing pads, the runner, and the lock plate are disposed, the sealed enclosure being filled with the lubricating oil.

9. The thrust bearing assembly of claim 8, wherein the at least one passage extends between the contact face and an opposing surface of the runner.

10. The thrust bearing assembly of claim 8, wherein the at least one passage has a reduced diameter proximate to the contact face.

11. The thrust bearing assembly of claim 8, wherein the at least one groove radially traverses a surface of the lock plate.

* * * * *